Nov. 14, 1950     R. H. VAUGHN ET AL     2,529,642
FISH LURE
Filed April 15, 1947
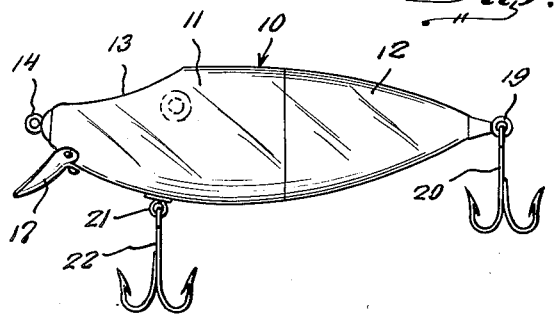
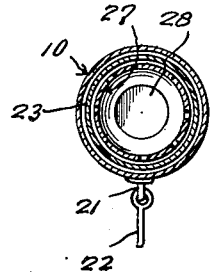
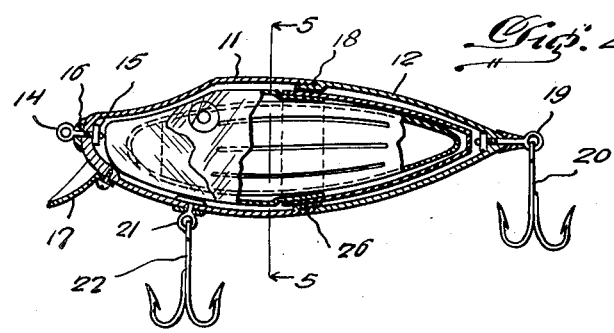
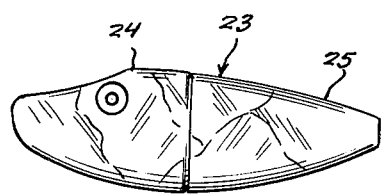
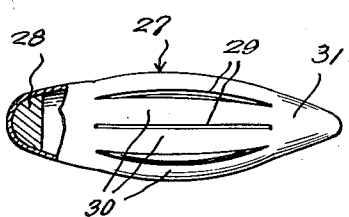
Inventors
Ralph H. Vaughn,
Conrad M. Loflen Patented Nov. 14, 1950

2,529,642

UNITED STATES PATENT OFFICE 2,529,642

FISH LURE

Ralph H. Vaughn and Conrad M. Loflen,
Oak Ridge, Tenn.

Application April 15, 1947, Serial No. 741,448

2 Claims. (Cl. 43—42.32)

This invention relates to improvements in fish lures and particularly to a plug or artificial minnow type of lure.

A number of plug type lures are now available but are usually solid members of wood or some similar material having a color coating and a predetermined weight. Each such plug is suitable for only one type of fish and one type of fishing, and in order to have the proper lure for each type of fish and for different conditions encountered while fishing, to change from a shallow travelling to a deep travelling plug, for instance, or to use a plug of a different color, different complete lures or plugs must be attached to the fishing line. This necessitates the purchase of a number of different lures and the carrying of several such lures on each fishing expedition.

It is among the objects of the present invention to provide an improved plug type lure which may be changed in weight and color as desired, to provide a changeable lure having a few simple easily assemblable parts, which is economical to manufacture and durable in use, and which can be quickly and easily altered to suit it to fishing for different kinds of fish and under different conditions.

Other objects and advantages will be apparent from a consideration of the following description in conjunction with the accompanying drawing wherein:

Figure 1 is a side elevational view of an improved plug type fishing lure illustrative of the invention;

Figure 2, a longitudinal sectional view of the lure illustrated in Figure 1;

Figure 3, an elevational view of a color liner for the lure or plug illustrated in Figure 1;

Figure 4, a side elevational view of a hollow weight member adapted to fit inside of the liner shown in Figure 3, a portion of the weight member being broken away and shown in section to better illustrate the construction thereof; and Figure 5, a transverse sectional view on the line 5—5 of Figure 2.

With continued reference to the drawing and particularly to Figures 1 and 2, the improved plug type lure comprises an elongated outer body, generally indicated at 10, of capsule form comprising two separable end portions 11 and 12. The front end member 11 is a modified tapered member of generally circular cross section having in one side thereof adjacent to the closed end a curved indentation 13 which will normally be at the top of the lure when the lure is floating in operative position in the water. An eye 14 by means of which the plug is attached to a fishing line is provided at the front or closed ends of the portion 11 and may conveniently comprise an eye bolt extending through an aperture in the front closed end of the portion 11 of the lure and provided with a nut 15 inside of the member 11 and a rounded washer 16 outside of the member. A scoop or deflector 17 is attached to the under surface of the portion 11 adjacent the front or closed end thereof and extends downwardly and somewhat forwardly relative to the plug 10. The indentation 13 and the deflector 17 operate to cause the plug to move in a lifelike manner when it is retrieved through the water after a cast, and also regulate the depth at which the plug travels through the water.

At its open end the member 11 is provided with internal screw threads which receives external screw threads provided on an inwardly offset end portion of the member 12, these screw threads provide means for connecting the two parts 11 and 12 together in a firm, and preferably waterproof, manner.

At its rearward or closed end the member 12 is provided with an eye 19 to which is pivotally attached a hook 20. An eye 21 extends from the normally underside of the member 11 at approximately the mid-length portion thereof and to this eye is pivotally attached a second hook 22.

The members 11 and 12 are comparatively thin walled members, as is clearly illustrated in Figure 2, and are preferably formed of a transparent material such as a suitable synthetic resin plastic.

In order to provide various color effects for the plug a number of liners, as illustrated in Figure 3 and generally indicated at 23, are provided. These liners are hollow thin walled members preferably formed in two separable end portions, as indicated at 24 and 25, associated by an overlapping slip joint, as indicated at 26 in Figure 2. The liners may be formed of suitable material such as paper or synthetic resin plastic and are provided exterially with suitable color patterns for different types of fish and different fishing conditions. The liners are shaped to fit closely inside of the hollow plug 10, as is clearly illustrated in Figure 2, and any desired liner may be operatively associated with the plug by merely disassociating the portions 11 and 12 of the plug, inserting the desired liner and reassembling the plug portions.

A weight carrier, generaly indicated at 27 and particularly illustrated in Figure 4, is tapered from its midlength portion toward both ends to fit the inside of the liner 23. This carrier 27 is a hollow thin walled member which may also be formed of a suitable synthetic resin plastic or other moldable, preferable somewhat resilient, material, said weight carrier having a shape substantially the same as the interior of the liner.

This carrier 27 has in the front end portion thereof a weight 28 which may be formed of lead or a similar heavy material, shaped to fit inside of the end of the carrier 27 and permanently secured in position. Intermediate its length the carrier 27 is provided with spaced longitudinal slits or cuts 29 which provide between them elongated ribs 30 which are preferably resiliently compressible so that when the carrier 27 is placed in the member 23 it will firmly engage the inner surface of the member 23 and will not move or rattle in the lure.

The end portion 31 of the weight carrier 27 may be made hollow or solid as may be desired to provide the desired balance for the lure.

Preferably several, and at least two, weight carriers are provided with each lure so that the weight of the lure can be varied for either deep or shallow movement through the water when the lure is retrieved from a cast.

The lure when in operative condition comprises three major portions, namely the outer member 10, the liner 23 and the weight member 27. Various liners and weight members may be placed in the same outer member to provide artificial lures of various color effects and of various weight and balance characteristics as may be desired so that it is necessary to provide only one outer portion in order to obtain the advantages of a large number of lures of different colors and weights.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A plug type fishing lure assembly comprising a two part hollow body of transparent material; a two part hollow colored liner fitting the interior of said body and removable therefrom; a weight carrier fitting the interior of said liner and removable therefrom, said weight carrier comprising a thin walled hollow member of resilient material tapered from the mid length portion toward both ends thereof, and having spaced longitudinal slits therein between the end portions thereof to provide elongated resilient ribs therebetween, and a weight in one end of said weight carrier.

2. A plug type fishing lure assembly comprising a hollow, elongated outer body of capsule form including two separable end portions, each tapered from its open to its closed end, a weight carrier in said outer body, a weight in said weight carrier, and a liner interposed between said weight carrier and said outer body, said liner comprising a thin walled, hollow body of a size and shape substantially the same as the size and shape of the interior of said outer body and including two separable end portions, said weight carrier comprising an elongated hollow body of resilient material having a shape substantially the same as the shape of the interior of said liner and having longitudinally extending, spaced apart slits therein providing longitudinally extending ribs there between which resiliently engage said liner to hold said liner and said weight carrier against relative movement, and said weight comprising a body of heavy material secured in one end of said weight carrier.

RALPH H. VAUGHN.
CONRAD M. LOFLEN.

REFERENCES CITED

The following references are of record in the file of this patent:

UNITED STATES PATENTS

| Number | Name | Date |
|---|---|---|
| 609,918 | Steinberger | Aug. 30, 1898 |
| 1,392,281 | Penfield | Sept. 27, 1921 |
| 1,612,264 | Cressy | Dec. 28, 1926 |
| 1,740,335 | Cowan | Dec. 17, 1929 |
| 2,112,385 | Smith | Mar. 29, 1938 |
| 2,173,540 | Rayburn | May 26, 1939 |
| 2,242,965 | Adams | May 20, 1941 |
| 2,256,173 | Schechterle | Sept. 16, 1941 |

FOREIGN PATENTS

| Number | Country | Date |
|---|---|---|
| 566,753 | Great Britain | Jan. 11, 1945 |